PHASE MODULATION KEYER

Filed Oct. 20, 1950

INVENTORS
BERT FISK
CHARLES L. SPENCER

BY D. C. Snyder
Howard White
ATTORNEYS

Patented Apr. 13, 1954

2,675,523

UNITED STATES PATENT OFFICE 2,675,523

PHASE MODULATION KEYER

Bert Fisk and Charles L. Spencer,
Washington, D. C.

Application October 20, 1950, Serial No. 191,296

5 Claims. (Cl. 332—23)

(Granted under Title 35, U. S. Code (1952), sec. 266)

This invention relates in general to a phase modulation keyer system and in particular to a new method and means of obtaining phase modulation.

In conventional phase modulation systems, phase modulation is usually accomplished through the use of heterodyning principles employing a reactance tube controlled beat oscillator. It has been generally found that this type of phase modulator fails to produce a sufficiently stable radio frequency driving signal for the transmitter since the stability of the system can be no better than the control oscillator to permit the best reception of the transmitted signal, especially with single side band type receivers. A further noted disadvantage of the commonly known phase modulator is the difficulty encountered in tuning and adjusting the modulator and associated apparatus over a range of frequencies to give the proper amount of phase deviation.

It is accordingly an object of the present invention to provide a new and improved phase modulation system of simple design.

It is a further object of the present invention to provide a new and improved phase modulator wherein the input and output frequencies are the same, to thereby provide a highly stable radio frequency driving signal for the transmitter and to also avoid the other disadvantages of the foregoing heterodyne system.

Another object of the present invention is to provide a new and improved phase modulator that functions to cancel a substantial portion of the amplitude modulation that usually accompanies phase modulation.

Still another object of the present invention is to provide a new and improved phase modulation keying system operative over a wide range of frequencies without requiring tuning for a change of frequency within the range.

Further objects and attainments of the present invention will become readily apparent upon a consideration of the following detailed description when taken in conjunction with the drawings in which.

Figures 1, 2, 3, 3A:
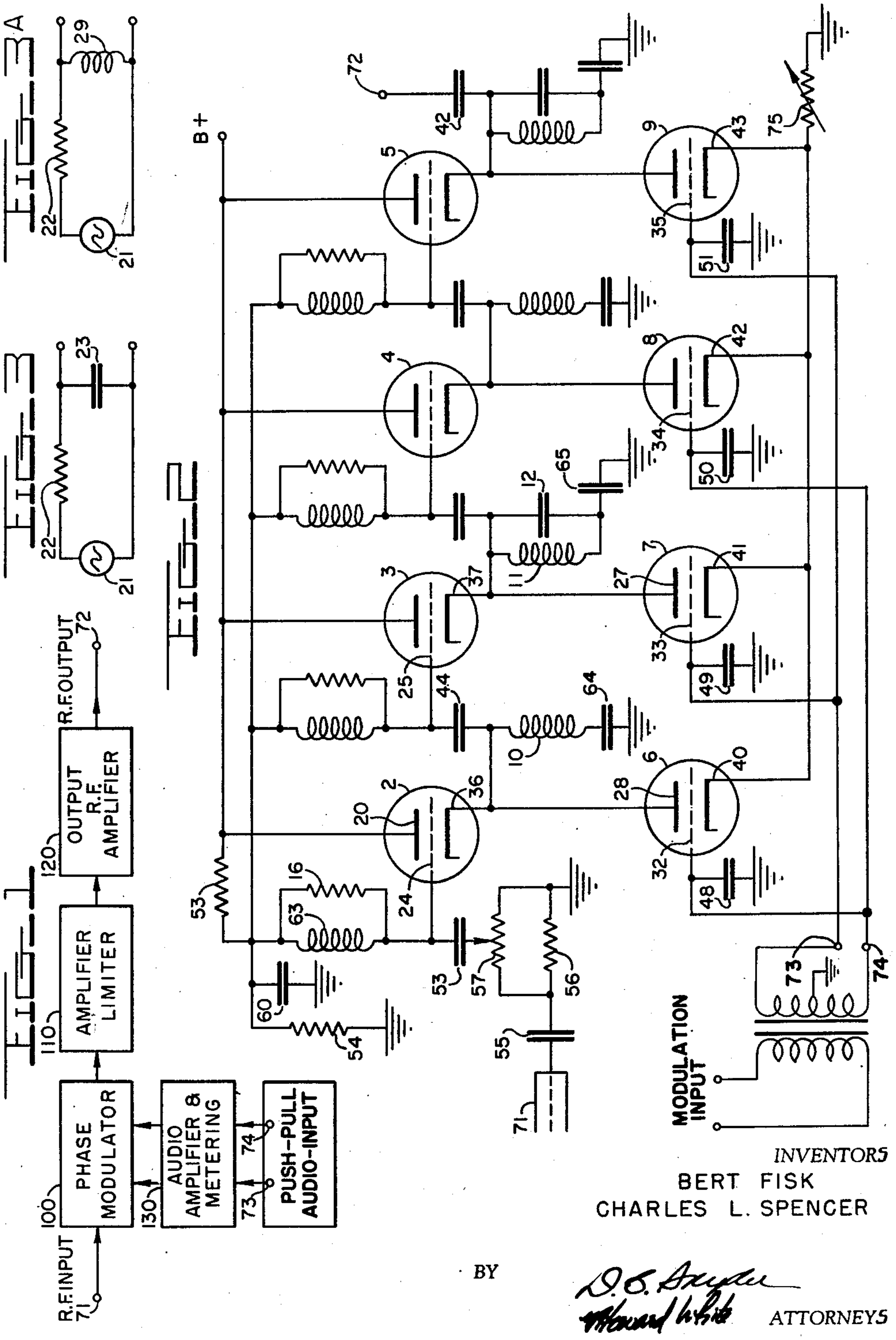
Fig. 1 is a block diagram of the phase modulation keyer system as taught by the present invention.
Fig. 2 is a schematic circuit diagram of the phase modulator system shown in Fig. 1.
Figs. 3 and 3A represent simplified schematic diagrams of different cathode follower circuits shown in Fig. 2.

In general the phase modulation keyer system of the present invention comprises essentially an untuned phase modulator network, followed by an untuned video amplifier-limiter and a tuned output amplifier stage. The phase modulator to which the present invention is more specifically directed, utilizes a plurality of variable phase shift networks connected in cascade. The individual networks comprising the chain include alternate capacitive and inductive reactance elements driven by a cathode follower amplifier with means for modulating the output impedance of the cathode follower and thereby the phase shift of the networks.

In more particular, the output impedance of each cathode follower is varied by employing a separate control vacuum tube to regulate the plate current flow through the cathode follower and thus the output impedance thereof. In the preferred embodiment cathode followers comprising the phase shift series operate into alternate inductive and capacitive loads. The respective alternate loads are tuned to the two extremes of the frequency range to permit equal operation at any one frequency within the range without tuning of the modulator. Audio or any other modulation signal for controlling the phase deviation provided by the cathode followers is applied to the series of control tubes respectively associated with each cathode follower. The audio modulation applied to the control tubes associated with the cathode followers having the inductive loads is 180° out of phase with that applied to the control tubes of the cathode followers having capacitive loads.

Referring now in particular to Fig. 1 there is shown a block diagram of a typical embodiment of the phase modulation keyer as taught by the present invention. In operation of the keyer system of Fig. 1 the continuous wave R. F. signal to be phase modulated is applied from a suitable source over input terminal 71 to phase modulator 100.

To control the phase modulation of the R. F. signal there is also applied to phase modulator 100 an audio modulating signal over input terminals 73 and 74. The audio modulation controlling signal applied over input terminals 73 and 74 appears as a pair of signals having a 180° phase difference and is applied to the modulator 100 through the audio amplifier and metering circuit 130. The audio signal is amplified in amplifier 130 and then applied to the phase modulator 100 where it serves to control the amount of phase modulation of the R. F. signal also applied to phase modulator 100.

The phase modulated signal emanating from phase modulator 100 is amplified in more or less wide band amplifier 110. In the conventional phase modulator there is a tendency to generate amplitude modulation and in the employment of a series of phase modulators the amplitude modulation is cumulative. In the present invention however the amplitude modulation is greatly reduced through the use of cathode followers, as hereinafter explained, alternately operative in push-pull into inductive and capacitive loads. The small amount of amplitude modulation that is generated by phase modulator 100 is suppressed by a limiting network incorporated in the amplifier 110. The amplified limited signal output from amplifier circuit 110 is then applied to an output radio frequency amplifier 120 which amplifies the R. F. phase modulated signal before keying the transmitter from terminal 72. Output amplifier 120 is a tuned amplifier whereas amplifier 110 and the phase modulator 100 are untuned. It is seen then that only one of the major components, output amplifier 120, of the present keyer system requires any particular adjustment or tuning thus rendering the keyer system extremely simple to operate with a minimum of maintenance.

Referring now specifically to Fig. 2 there is shown the schematic circuit diagram of the phase modulator 100 of Fig. 1. In the circuit shown in Fig. 2 the substantially pure continuous wave R. F. signal input is received from a suitable source preferably over an R. F. coaxial line 71. Capacitor 55 functions as a blocking capacitor and resistors 56 and 57 tied in parallel between the input and ground form a terminating impedance for the R. F. coaxial line 71. The R. F. signal is applied to grid 24 of vacuum tube 2 through isolating resistor 56 and resistor 57 also functioning as R. F. gain control or input level resistor.

Vacuum tubes 2, 3, 4 and 5 and their associated circuitry form the cathode follower amplifier phase shift circuits connected in cascade. The circuitry for vacuum tubes 3, 4 and 5 is identical to that of vacuum tube 2 except for the cathode load impedances. Accordingly, only the circuitry of vacuum tube cathode follower amplifier 2 will be described in detail. Cathode followers 2—5, as well as control tubes 6—9, are shown as triodes, it is to be understood, of course, that any other type of vacuum tube may be employed within the skill of the art, without special limitations or requirements.

Resistors 53 and 54 connected in common to the grid circuits of all the cathode followers form a divider network between the source of B+ potential and ground to provide the operating bias for the tubes. Capacitor 60 connected to the junction of resistors 53 and 54 serves as a by-pass condenser to ground to eliminate any ripple voltage that may be present on the grids. There is also shown in the grid 24 circuit of vacuum tube 2 a parallel inductance 63 and a resistance 16 which serves as a grid return. Inductor 63 serves as a choke to offer a high impedance to R. F. signals and a low impedance to audio modulating signals. Resistor 16 is a parasitic suppressor to prevent the occurrence of oscillation in the circuits. Anode 20 is tied directly to the source of B+ potential.

Each of the cathode followers 2 through 5 is connected in series with a second tube which serves as a resistive load for its respective follower whereby variations in the impedance of these tubes operate to vary the plate current of the cathode follower and thus the output impedance of the follower. In the case of the first cathode follower 2 its cathode 36 is tied directly to anode 26 of vacuum tube 6. Similarly, cathode 37 of cathode follower 3 is tied directly to anode 27 of vacuum tube 7. Shunting tube 6 is an inductive reactance comprising inductance coil 10 tied to the cathode 36 and ground through by-pass condenser 64. Shunting the second cathode follower loading tube 7 is a capacitive reactance comprising capacitance 12 tied to cathode 37 and ground through by-pass condenser 65. Capacitors 64 and 65 merely serve as a D. C. isolation and have an impedance substantially lower than the impedance of the respective reactive load elements 10 and 12. Since the inductive load 10 of cathode follower 2 has an inherent shunt capacitance as well as the inherent shunt of the tube itself, there is added an inductance 11 across capacitor 12 to maintain a reciprocal capacitive-inductive reactive load relationship. In connecting the cathode followers in cascade the output of each cathode follower amplifier is applied to the grid of the next cathode follower through an isolating capacitor. Such a connection is shown as including capacitor 44 connecting the first stages 2 and 3 together. Cathode followers 2 and 3 drive inductive and capacitive loads 10 and 12 respectively as more fully described hereinafter. In order that the phase shifts produced by the capacitive and inductive loaded cathode followers add rather than oppose in the respective circuits the modulation signals are applied in push-pull to adjacent control tubes.

Vacuum tubes 6, 7, 8 and 9 are operative to control the output impedance of cathode followers 2 through 5 by controlling the resistance loading thereof and thus the plate current flow. The operation of vacuum tube control circuits 6 through 9 is conventional wherein the amount of plate current drawn thereby is proportional to the amplitude of the voltage applied to its grid. The vacuum tube control tubes are employed rather than the conventional cathode follower cathode resistors to more uniformly vary the amount of current drawn by the cathode followers and accordingly to more uniformly vary the phase shift.

The control grids of alternate loading tubes, grid 32 of vacuum tube 6 and the control grid 34 of vacuum tube 8, are tied to the audio input terminal 74 and receive one audio phase whereas the control grids of the remaining loading tubes, grid 33 of vacuum tube 7 and the control grid 35 of vacuum tube 9, are tied to audio input terminal 73 and receive the opposite audio phase. The cathodes of each of the control tubes 6 through 9 are tied in common to ground through resistor 75 which is variable for setting the operating level of the tubes at the linear portion of the plate current vs. plate voltage characteristic curve. Capacitors 48 through 51 connecting the respective grids of tubes 6 through 9 to ground serve as grid radio frequency by-pass condensers for eliminating any R. F. component that is likely to be present because of the high radio frequency voltage on the plates of the respective tubes.

In operation of the circuits shown in Fig. 2 cathode follower amplifier circuit 3 may be considered equivalent to an A. C. generator 21 in series with resistance 22 which represents the output impedance of the cathode follower and capacitance 23 as shown in Fig. 3. Cathode follower amplifier circuit 2, on the other hand, may be considered equivalent to an A.-C. generator 21 in series with resistance 22 and inductance 29 as shown in Fig. 3A. The output impedance of each of the cathode follower circuits may be computed by:

$$R_k=\frac{R_p}{\mu+1}$$

It is seen then that by changing the plate current and therefore the value of $R_p$ of the cathode followers the output impedance thereof is changed. A change of the impedance of the cathode followers of course varies the phase of the signal appearing across the reactive loads.

As previously mentioned one of the primary purposes of the present invention is to render the system equally operable at any one frequency over a range of frequencies without requiring additional tuning for a change of frequencies within the range. This is accomplished in the present invention by adjusting the capacitive and the inductive loads to give a maximum phase deviation respectively at the two extremes of the frequency range. More specifically at the lowest frequency for which the circuit shown in Fig. 2 is designed to operate the cathode output impedance of cathode follower 2 is substantially equal to the inductive reactance of inductive coil 10 to give an average phase shift of approximately 45 degrees. At the highest frequency for which the circuit of Fig. 2 is designed to operate the cathode output impedance of cathode follower 3 is substantially equal to the capacitive reactance of capacitor 12 to give an average phase shift of approximately 45 degrees.

In a constructed embodiment of the present invention the phase modulator of Fig. 2 was designed to be equally operable at any one frequency within a range of frequencies of 2–5 mc. Assume, therefore, for purposes of illustration that the operating radio frequency range of the circuit in Fig. 2 is 2–5 mc. At 2 mc. a maximum phase shift of approximately 45° will occur in cathode follower circuit 2. At 5 mc. a maximum phase shift of approximately 45° will occur in cathode follower circuit 3. As the frequency is increased say from 2 mc. to 5 mc., the amount of phase shift variation produced by cathode follower 2 decreases whereas the amount of phase shift variation in cathode follower circuit 3 increases. Through the use of alternate inductive and capacitive loads there is obtained a linear or uniform phase shift over the entire range of frequencies, in this instance 2 to 5 mc. This permits therefore the operation of the phase modulator over a wide range of frequencies with a uniform amount of phase shift without additional tuning.

As previously mentioned the conventional phase modulator networks and particularly a network comprising a series of cathode followers each having identical load circuits, there is a tendency for each circuit to generate amplitude modulation. Further the amplitude modulation generated by each network in the series is cumulative, accordingly the series generates a substantial amount of amplitude modulation. The present invention eliminates to a great extent the generation of amplitude modulation that is normally present in the conventional system. This is accomplished by rendering the cascade cathode follower phase modulators alternately operative in push-pull into inductive and capacitive load circuits. The amplitude modulation generated by the inductive loaded cathode follower circuit is in opposition to the amplitude modulation generated by the capacitive loaded cathode follower circuit. Accordingly the amplitude modulation generated by the individual circuits is cancelled in most part rather than cumulative.

The amount of phase shift varies of course with the output impedance of the cathode follower tubes since the inductive reactance of coil 10 and the capacitive reactance of capacitor 12 is of a fixed value. The impedance of the cathode follower amplifiers is, as previously stated, controlled by the current on the respective cathodes applied thereto from the corresponding vacuum tube control circuits.

The additional push-pull pair of cathode followers 4 and 5 are employed in the exemplary embodiment shown in Fig. 2 in an additive manner to increase the phase shifting of the signal to the desired amount. In a particular constructed embodiment of the present invention, for instance, it was desired to have approximately a one radian phase shift. It was found that a single push-pull stage would only produce approximately 15° of phase shift, accordingly two stages were employed. It is obvious, however, that any number of pairs of tubes may be employed without departing from the spirit of the invention, although it may be pointed out that the amplitude of the signal drops with each additional stage and if more than two push-pull stages are employed the signal would need to be amplified before being applied to the additional stages. Conventional amplifying means would suffice.

Although we have shown only a certain and specific embodiment of the present invention, it is to be expressly understood that many modifications are possible thereof without departing from the true spirit of the invention.

The invention described herein may be manufactured and used by or for the Government of the United States of America for governmental purposes without the payment of any royalties thereon or therefor.

What is claimed is:

1. A phase modulator for a wide band of signal frequencies comprising a cascaded chain of vacuum tubes each having at least an anode, cathode and grid elements, a continuous radio frequency signal source connected to the grid of the first of said cascade of tubes, an inductive load connected to the cathode of the first of said cascade and alternate tubes thereafter, the inductive loads being adapted to provide a reactance substantially equal to the output impedance of the tubes to which they are connected at the low end of the frequency band of the signals to be modulated, and a capacitive load connected to the cathode of the remaining tubes in said cascade; said capacitive loads being adapted to provide a reactance substantially equal to the output impedance of the tubes to which they are connected at the high end of the frequency band of the signals to be modulated, and a second series of vacuum tubes each having an anode, cathode and grid element, means for connecting the anode of each of said second series of vacuum tubes to the cathode of a respective one of said first series of vacuum tubes, and means for applying a modulation signal to the grids of said second series of vacuum tubes with 180° phase distinction between successive grids.

2. A phase modulation keyer system for a wide band of signal frequencies comprising a continuous radio frequency signal source and a source of modulation signals, a phase modulator having a first series of vacuum tubes each having at least an anode, cathode and grid elements with the cathode of each tube connected to the grid of the next to form a cascaded chain, means for applying said continuous radio frequency signal to the grid of the first of said series of vacuum tubes, an inductive load connected to the cathode of the first of said series and alternate tubes thereafter, the inductive loads being adapted to provide a reactance substantially equal to the output impedance of the tubes to which they are connected at the low end of the frequency band of the signals to be modulated, and a capacitive load connected to the cathode of the remaining tubes in said series; said capacitive loads being adapted to provide a reactance substantially equal to the output impedance of the tubes to which they are connected at the high end of the frequency band of the signals to be modulated, a second series of vacuum tubes each having at least a cathode, anode and grid elements, means for connecting the anode of each of said second series of vacuum tubes to the cathode of a respective one of said first series of vacuum tubes, and means for applying said modulation signal to the grids of said second series with a 180° phase distinction between successive grids.

3. A phase modulation keyer system for a wide band of signal frequencies comprising a continuous radio frequency signal source and a source of modulation signals, a phase modulator having a first series of vacuum tubes each having at least an anode, cathode and grid elements with the cathode of each tube coupled to the grid of the next to form a cascaded chain, means for applying said continuous radio frequency signal to the grid of the first of said series of vacuum tubes, an inductive load connected to the cathode of the first of said series and alternate tubes thereafter, the inductive loads being adapted to provide a reactance substantially equal to the output impedance of the tubes to which they are connected at the low end of the frequency band of the signals to be modulated, and a capacitive load connected to the cathode of the remaining tubes in said series; said capacitive loads being adapted to provide a reactance substantially equal to the output impedance of the tubes to which they are conneced at the high end of the frequency band of the signals to be modulated, a second series of vacuum tubes each having at least a cathode, anode and grid elements, means for connecting the anode of each of said second series of vacuum tubes to the cathode of a respective one of said first series of vacuum tubes and means for applying said modulation signal to each grid of said second series with a 180° phase distinction between successive grids to phase modulate said radio frequency signal in accordance with said modulation signal; a limiter circuit to suppress any amplitude modulation generated by said phase modulator, and an amplifier to amplify said phase modulated radio frequency signal.

4. A phase modulator circuit for a wide band of signal frequencies comprising, one or more resistance-capacitance phase shift networks each adapted to provide substantially 45 degree phase shift at the high end of the frequency band to be modulated, one or more resistance-inductance phase shift networks tandemly connected with said first mentioned phase shift networks, each adapted to provide substantially 45 degree phase shift at the low end of the frequency band to be modulated, and means for simultaneously varying the resistances of the first mentioned phase shift networks in opposition with the resistances of the second named phase shift networks.

5. A phase modulator circuit for a wide band of signal frequencies comprising, a plurality of grid controlled vacuum tubes connected in cascaded relation, each of said tubes having a finite output impedance, separate inductance means connected to certain of said tubes to form a load therefor, separate capacitive means connected to the other of said tubes to form a load therefor, the capacitative reactance of the capacitive loads being adapted to equal the output impedance of the associated tubes at the high end of the frequency band to be modulated, the inductive reactance of the inductive loads being adapted to equal the output impedance of the associated tubes at the low end of the frequency band to be modulated, and means for varying the output impedance of the capacitively loaded tubes simultaneously in opposition with the impedances of the inductively loaded tubes.

References Cited in the file of this patent

UNITED STATES PATENTS

| Number | Name | Date |
|---|---|---|
| 2,436,834 | Stodola | Mar. 2, 1948 |
| 2,492,184 | Royden | Dec. 27, 1949 |
| 2,506,329 | Ames | May 2, 1950 |